J. C. WILSON.
MEANS FOR SECURING BEDSTEAD SPINDLES.
APPLICATION FILED NOV. 3, 1909.
959,093.
Patented May 24, 1910.
2 SHEETS—SHEET 1.
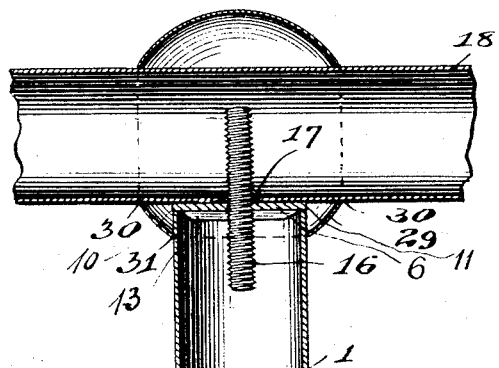
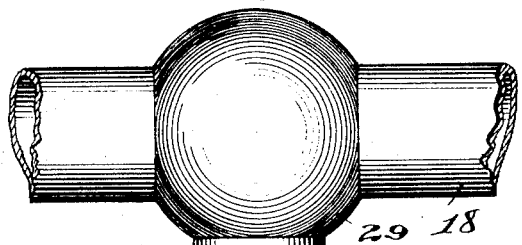
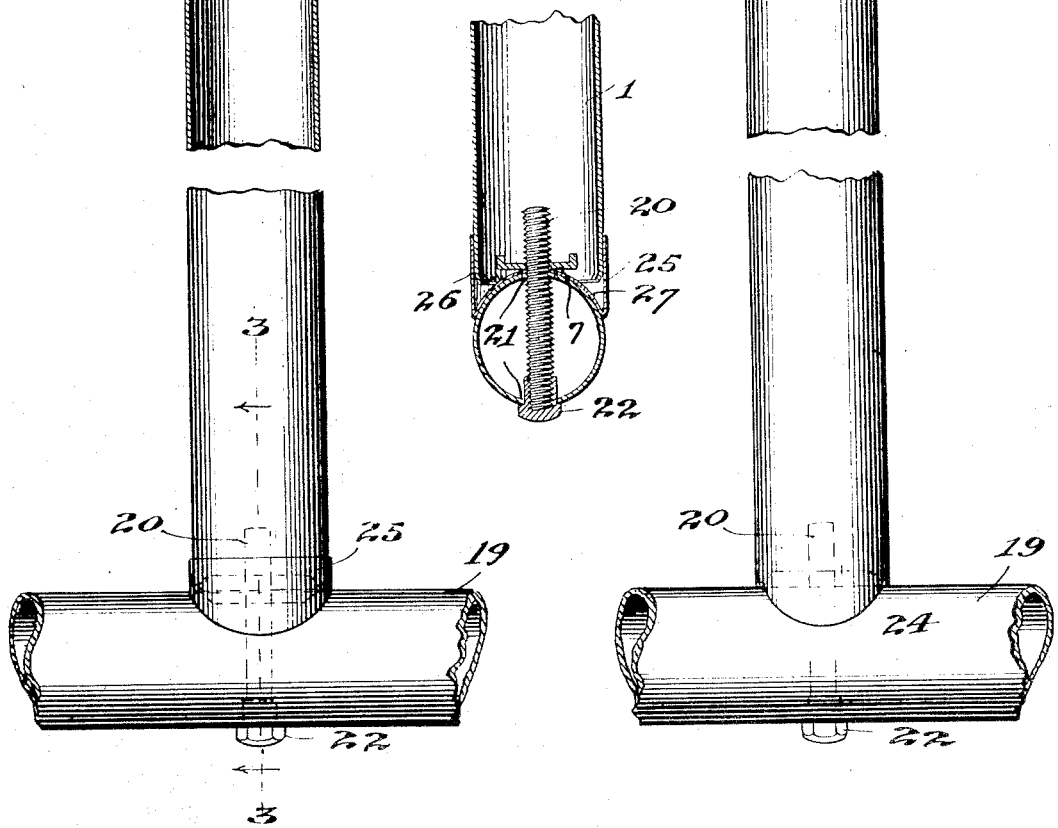

J. C. WILSON.
MEANS FOR SECURING BEDSTEAD SPINDLES.
APPLICATION FILED NOV. 3, 1909.
959,093.
Patented May 24, 1910.
2 SHEETS—SHEET 2.
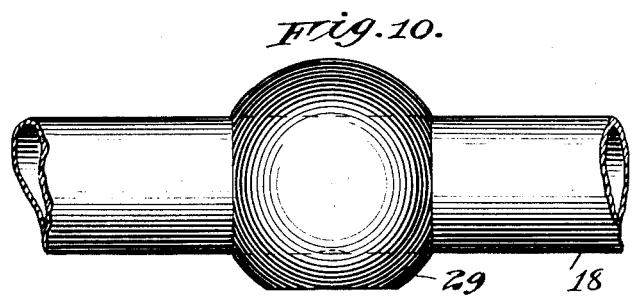
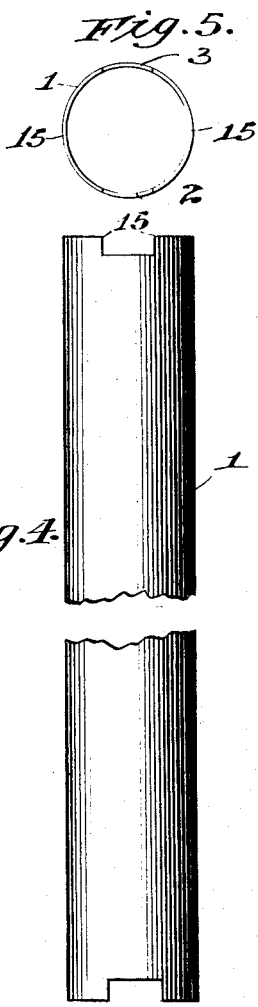
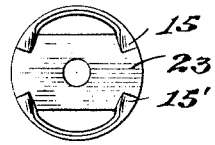
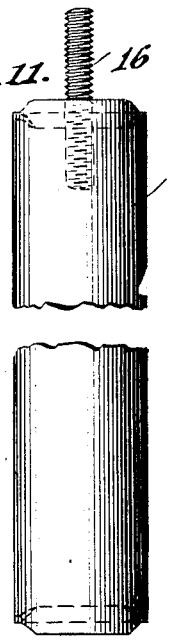
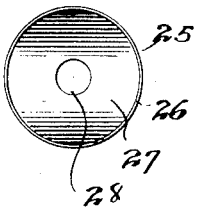
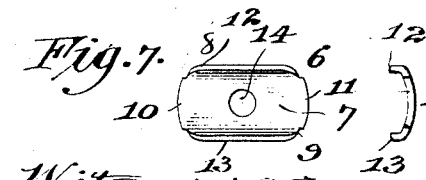
Witnesses,
Inventor;
John C. Wilson
By Offield, Towle, Graves & Offield
Attys.

UNITED STATES PATENT OFFICE.

JOHN C. WILSON, OF KENOSHA, WISCONSIN, ASSIGNOR TO THE SIMMONS MANUFACTURING COMPANY, OF KENOSHA, WISCONSIN, A CORPORATION OF WISCONSIN.

MEANS FOR SECURING BEDSTEAD-SPINDLES.

959,093.            Specification of Letters Patent.      Patented May 24, 1910.

Application filed November 3, 1909. Serial No. 525,997.

*To all whom it may concern:*

Be it known that I, JOHN C. WILSON, a resident of Kenosha, in the county of Kenosha and State of Wisconsin, have invented certain new and useful Improvements in Means for Securing Bedstead-Spindles, of which the following is a full, clear, and precise specification.

My invention relates to improved means for securing spindles to their supporting members in metallic bedsteads.

In bedsteads, particularly brass bedsteads, vertical spindles are connected between horizontal supporting members of the head and foot frames of the bedstead. In the spindle ends threaded pieces or nuts are usually secured for receiving stay pins or screws. In the prior art the ends of the spindle have been indented and rendered irregular to form supporting and securing means for the nuts, this construction hindering to a great degree proper and uniform buffing and lacquering of the spindles. Furthermore, the irregularities extend a considerable distance inwardly from the spindle ends, thus requiring comparatively large trimming or finish pieces.

Among the salient objects of my invention are to provide a construction in which all indentures and irregularities are eliminated, which results in a smooth, uniform and straight outer surface for the spindles which can thus be more easily and uniformly buffed and lacquered; to provide a construction which limits the attachment of nuts to the extreme ends of the spindles whereby trimming or finish pieces, if used, need be very small; to provide a construction in which the method of securing the nuts to the spindle ends will result in concave ends which will snugly receive curved supporting members to lock the spindles against rotational displacement and to eliminate the necessity of finish pieces; to provide a construction in which nuts can be more quickly, more accurately and more securely applied to the spindles with little labor; and in general to provide a construction and arrangement which will securely and rigidly hold the members together with a minimum number of parts and which will present a finished and neat appearance.

My improved construction and arrangement is clearly shown in the following specification and accompanying drawings, in which drawings—

Figure 1 is an elevation view of sections of upper and lower horizontal supporting members connected together by a spindle, the upper part of the spindle and the top supporting member being in diametral section, Fig. 2 is an elevation view of the parts shown in Fig. 1, showing a somewhat modified arrangement of connecting the spindle with the lower supporting member, Fig. 3 is a sectional view taken on plane 3—3, Fig. 1, Figs. 4, 5 and 6 show in detail the construction of a spindle, Fig. 4 being an elevation view of the spindle, and Figs. 5 and 6 upper and lower end views respectively, Fig. 7 is a plan view of the inner side of a nut which I employ, Fig. 8 is an end view of the nut, Fig. 9 is an end view of the spindle showing a nut secured thereto, Figs. 10 to 15 show the parts of Fig. 1 but separated, Fig. 10 showing the top supporting member with a finish piece thereon, Fig. 11 showing the spindle with the nut attachments, Fig. 12 showing a finish piece for the lower end of the spindle, Fig. 13 showing the lower supporting member and Fig. 14 showing a screw for passing through the lower supporting member into engagement with the nut at the lower end of the spindle, and Fig. 15 is a plan view of the under side of the finish piece shown in elevation in Fig. 12.

Referring to Figs. 4, 5 and 6, the spindle 1 is shown in the form of a tube having diametrically opposite slots 2 and 3 cut into its upper end and similar slots 4 and 5 cut in its lower end.

Referring to Figs. 1, 7 and 8, the nut 6 has a rectangular body part 7 whose edges 8 and 9 are curved to a radius equal to the inner radius of the spindles, and these edges have short projections 10 and 11 whose radius is equal to the outer radius of the spindles. During formation of the nut the body part is slightly arched, as shown in Fig. 8 and the ends 12 and 13 are bent at right angles, this construction giving the nut great strength to prevent longitudinal flexure thereof when the spindles are applied to the supporting members. At the center of the nut is a threaded opening 14.

The projections 10 and 11 of the nuts have the same width as the slots cut in the spindle ends and when the nuts are applied to the spindle ends with the nut ends 12 and 13 extending inwardly these projections engage in the slots and the edges 8 and 9 engage the inner surface of the spindle, the nuts being thus securely held in place. The ends or points 15' of the end sections 15 between the slots are now turned inwardly against the nut, pressure at the same time being applied to the nut so that the arch is taken out of the projections 10 and 11, and these projections become straight to snugly engage the bases of the spindle slots. The nuts are thus firmly and accurately locked in place with their openings 14 at the center of the spindle.

Into the upper nut of each spindle is threaded a stay pin 16 which upon assembly enters an opening 17 in the top supporting member 18, as shown in Fig. 1. The lower ends of the spindles abut against the lower supporting member 19 and are secured in place by a screw 20 passing through openings 21 in the lower member and into the lower spindle nuts. The screws may have shanks of cheaper material and a separate head 22 of ornamental material. The inturned ends 15 and the nuts form concave pockets 23 which snugly receive the supporting members and assist in securely holding the spindles in position. The end sections 15 instead of having their points 15' bend abruptly inward can be gradually bent inwardly from a central point so that the resultant edges 24 are semi-circular to closely fit the supporting members, as shown in Fig. 2. Where this construction is used the nuts are preferably of the same material as the spindles so that a finish connection will result without the necessity of special finish or trim pieces. After turning over of the ends 15 to clamp the nut the ends and the nut face can also be ground to present a more regular cylindrical pocket which will more accurately receive the supporting members. When the construction shown in Fig. 9 is used or where further finish or trim is desired suitable finish pieces can be applied.

As shown in Figs. 1, 3, 12 and 15, a finish piece in the form of a ferrule 25 is provided for the connection of the spindles with the lower supporting member 19. This ferrule comprises a cylindrical sleeve 26 having a concave cylindrical floor 27 provided with a central opening 28. The ferrules are slipped over the lower ends of the spindles, the screws 20 passing through openings 28, and the cylindrical concave bases of the ferrules engaging intimately with the tubular supporting member, so that a perfect fit and finish is secured. In the connection between the upper ends of the spindles and the upper supporting members, as shown, the spindles are not rigidly held to the supporting member and a finish member is desirable. This finish member may be in the form of a spherical shell or husk 29 which has side openings 30 for receiving the supporting member and a lower opening 31 for receiving a spindle. The same attachment as that used for the lower spindle ends with the lower supporting member could of course be used for the upper spindle ends with the upper supporting members, the pin 16 in this case being replaced by a screw 20. The threaded pin 16 instead of passing freely through opening 17 could have threaded engagement with this opening so that the upper end of the spindle could be rigidly secured to the supporting member.

In the construction and arrangement which I have shown and described only the extreme ends of the spindles are utilized for securing the nuts in place and the outer surface of the spindles remains smooth and straight and can thus be very readily and uniformly buffed and lacquered, there being no indentures or irregularities which would be a hindrance to buffing and lacquering. The process of securing the nuts in position automatically results in concave spindle ends which snugly receive the supporting members and which bring the spindle ends closer to the supporting member centers so that if finish or trim pieces are desired they need be very small as compared with trim pieces necessary in prior constructions. Furthermore, by a slightly modified arrangement the concave ends will so snugly and securely engage the supporting members that trim pieces will be unnecessary. These concave ends also prevent rotational displacement of the spindles thereby preventing loosening of the screws. The entire bedstead with my arrangement will present a very neat and substantial appearance.

Having thus described my invention and its various desirable features, I desire to secure the following claims by Letters Patent.

1. In combination, a tube having slots in its end, and a connecting member extending across the tube end and engaging in said slots, only that part of the tube end adjacent said slots being bent against the connecting member to secure the connecting member to the tube, the remainder of the tube end remaining unbent.

2. In combination, a tube having two diametrically opposite slots extending longitudinally from the end of the tube, and a connecting member bridging across the tube end and engaging in said slots, the corners of the tube end adjacent said slots being bent inwardly against the connecting member to lock the connecting member in said slots, the remainder of the tube end remaining unbent.

3. In combination, a tube having two diametrically opposite slots extending longitudinally from one end of the tube, and a connecting member bridging across the end of the tube, said connecting member having a body part with curved ends to fit the interior of the tube and having extensions for passing through said slots, the ends of the tube adjacent said connecting member being bent against the connecting member to lock the connecting member to the tube.

4. In combination, a tube, and a connecting member bridging across one end of the tube, said connecting member having a body part abutting against the inside of the tube and having projections, there being slots through the tube wall for receiving said projections, only that part of the tube end adjacent said projections being bent over against the connecting member to secure said connecting member to the tube, the remainder of the tube end remaining unbent.

5. In combination, a tube, a connecting member bridging across one end of said tube, said connecting member having rounded ends for abutting against the inside of the tube, and extensions from the ends of said connecting member having curved outer surfaces for registering with the outside surface of the tube, said tube having slots extending longitudinally from its end through which slots said extensions extend, the material of the tube adjacent said slots being bent over against the connecting member to secure said member to the tube.

6. In combination, a tube, a connecting member extending diametrically across the tube just within an end thereof, the sides of the member being bent at an angle, said tube having diametrically opposite slots cut longitudinally inwardly from the tube end, the ends of the connecting member extending through said slots, and shoulders at the base of the connecting member ends abutting against the inside of the tube, the side walls of the slots being bent inwardly against the connecting member, said connecting member having a threaded opening whereby said connecting member and thereby said tube may be connected with other objects.

7. In a spindle for bedsteads, the combination of a tube having slots cut through its wall at one end thereof, and a connecting member extending across the tube and through said slots, the sections of the tube adjacent said slots being bent over against the connecting member, said connecting member together with the tube ends and the bent over sections forming a concave channel across the tube end for receiving other bedstead parts.

8. In a bedstead frame, the combination of a supporting member, a tube forming a spindle, said tube having slots at its ends, a connecting member extending diametrically across the tube with its ends disposed in said slots, the tube material adjacent the connecting member ends being turned over against the connecting member to lock the connecting member to the tube, said connecting member and the tube ends with the turned over material forming a diametrical concave channel across the ends of the tube having the same curvature as the supporting member, and means engaging said supporting member and said connecting member for securing said spindle to the supporting member.

9. In a bedstead frame, the combination of a supporting member, a tube forming a spindle, said tube having slots at its ends, a connecting member extending diametrically across the tube with its ends disposed in said slots, the tube material adjacent the connecting member ends being turned over against the connecting member to lock the connecting member to the tube, said connecting member and the tube ends with the turned over material forming a diametrical concave channel across the ends of the tube having the same curvature as the supporting member, said connecting member having a threaded opening, and a screw passing through the supporting member and through said threaded opening to secure the spindle to the supporting member.

10. In combination, a curvilinear supporting member, a tube having slots cut in its walls at one end, a connecting member extending across the tube end and projecting into said slots, the tube ends adjacent said slots being bent over with their ends against the connecting member to lock the connecting member to the tube, the bent tube ends and the connecting member forming a concave channel across the tube end and having curvilinear edges for accurately fitting the curvilinear supporting member, and means engaging said supporting member and said connecting member to lock the tube to the supporting member.

In witness hereof, I hereunto subscribe my name this 23rd day of October A. D. 1909.

JOHN C. WILSON.

Witnesses:
J. H. CANTWELL, Jr.,
GUS JACOB.